(12) United States Patent
Jo

(10) Patent No.: US 11,102,431 B2
(45) Date of Patent: Aug. 24, 2021

(54) IMAGE SENSOR

(71) Applicant: SK hynix Inc., Gyeonggi-do (KR)

(72) Inventor: Wan Hee Jo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/805,913

(22) Filed: Mar. 2, 2020

(65) Prior Publication Data
US 2021/0120196 A1 Apr. 22, 2021

(30) Foreign Application Priority Data

Oct. 17, 2019 (KR) .................. 10-2019-0128950

(51) Int. Cl.
*H04N 5/359* (2011.01)
*H04N 5/365* (2011.01)
*H04N 9/04* (2006.01)
*H04N 17/02* (2006.01)

(52) U.S. Cl.
CPC ............ *H04N 5/359* (2013.01); *H04N 5/365* (2013.01); *H04N 9/04551* (2018.08); *H04N 17/02* (2013.01)

(58) Field of Classification Search
CPC .... H04N 5/359; H04N 5/365; H04N 9/04551; H04N 17/02
See application file for complete search history.

(56) References Cited

U.S. PATENT DOCUMENTS

| 2011/0069210 A1* | 3/2011 | Ogura | ............... H04N 9/04557 348/247 |
| 2016/0050376 A1* | 2/2016 | Fridental | ............. H01L 27/1463 348/302 |

FOREIGN PATENT DOCUMENTS

KR 10-2003-0002887 A 1/2003

* cited by examiner

*Primary Examiner* — Michael E Teitelbaum
(74) *Attorney, Agent, or Firm* — IP & T Group LLP

(57) ABSTRACT

An image sensor which relates to a technology for estimating crosstalk of each pixel is disclosed. The image sensor includes a pixel array including a plurality of unit test patterns, each of which is used to measure values of crosstalk components of a plurality of light blocking pixels generated by a single open pixel, the light blocking pixels and the single open pixel included in the unit test pattern, a storage circuit configured to store the measured values of the respective unit test patterns, a calculation circuit configured to calculate a crosstalk value about each target pixel included in the pixel array by combining the stored values, and a correction circuit configured to correct pixel data of the target pixel by reflecting the calculated crosstalk value in the pixel data.

20 Claims, 12 Drawing Sheets ations of both are claimed.
IMAGE SENSOR

CROSS-REFERENCE TO RELATED APPLICATION

This patent application claims priority under 35 U.S.C. § 119 to Korean patent application No. 10-2019-0128950, filed on Oct. 17, 2019, the disclosure of which is herein incorporated by reference in its entirety.

TECHNICAL FIELD

Embodiments of the disclosed technology generally relate to an image sensor, and more particularly to a technology for estimating and correcting crosstalk of each pixel.

BACKGROUND

Generally, a Complementary Metal Oxide Semiconductor (CMOS) Image Sensor (CIS) implemented by a CMOS process has been developed to have lower power consumption, lower costs, and smaller sizes than other competitive products. Thus, CMOS image sensors (CISs) have been intensively researched and have rapidly come into widespread use. Specifically, CMOS image sensors (CISs) have been developed to have higher image quality than other competitive products, such that the application scope of CMOS image sensors (CISs) has recently been extended to video applications that require higher resolution and higher frame rate as compared to competitive products.

Differently from a solid state image pickup device, it is necessary for the CMOS image sensor (CIS) to convert analog signals (pixel signals) generated from a pixel array into digital signals. In order to convert analog signals into digital signals, the CMOS image sensor (CIS) has been designed to include a high-resolution Analog-to-Digital Converter (ADC).

The analog-to-digital converter (ADC) may perform correlated double sampling about an analog output voltage indicating an output signal of the pixel array, and may store the resultant voltage in one or more line memories. In addition, a sense amplifier may sense and amplify the digital signal readout from the line memory through a column line to generate an amplified digital signal.

SUMMARY

Various embodiments of the disclosed technology are directed to providing an image sensor that substantially addresses one or more issues due to limitations and disadvantages of the related art.

Embodiments of the disclosed technology relate to an image sensor capable of correcting a crosstalk component of each pixel by measuring and calculating the crosstalk component of a light blocking pixel, resulting in improvement in pixel performance.

In accordance with an embodiment of the disclosed technology, an image sensor may include a pixel array including a plurality of unit test patterns, each of which is used to measure values of crosstalk components of a plurality of light blocking pixels generated by a single open pixel, the light blocking pixels and the single open pixel included in the unit test pattern, a storage circuit configured to store the measured values of the respective unit test patterns, a calculation circuit configured to calculate a crosstalk value about each target pixel included in the pixel array by combining the stored values, and a correction circuit configured to correct pixel data of the target pixel by reflecting the calculated crosstalk value in the pixel data.

It is to be understood that both the foregoing general description and the following detailed description of the disclosed technology are illustrative and explanatory, and are intended to provide further description of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Reference will now be made in detail to embodiments of the disclosed technology, examples of which are illustrated in the accompanying drawings. Wherever possible, the same reference numbers are used throughout the drawings to refer to the same or like portions. Throughout the specification of the disclosed technology, if a certain part is connected (or coupled) to another part, the term "connection or coupling" means that the certain part is directly connected (or coupled) to another part and/or is electrically connected (or coupled) to another part through the medium of a third party. Spatially relative terms, such as "below", "beneath," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout the specification of the disclosed technology, if a certain part includes a certain component, the term "comprising or including" means that a corresponding component may further include other components unless a specific meaning opposite to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the disclosed technology. A singular expression may include a plural expression unless stated otherwise.

Figure 1:
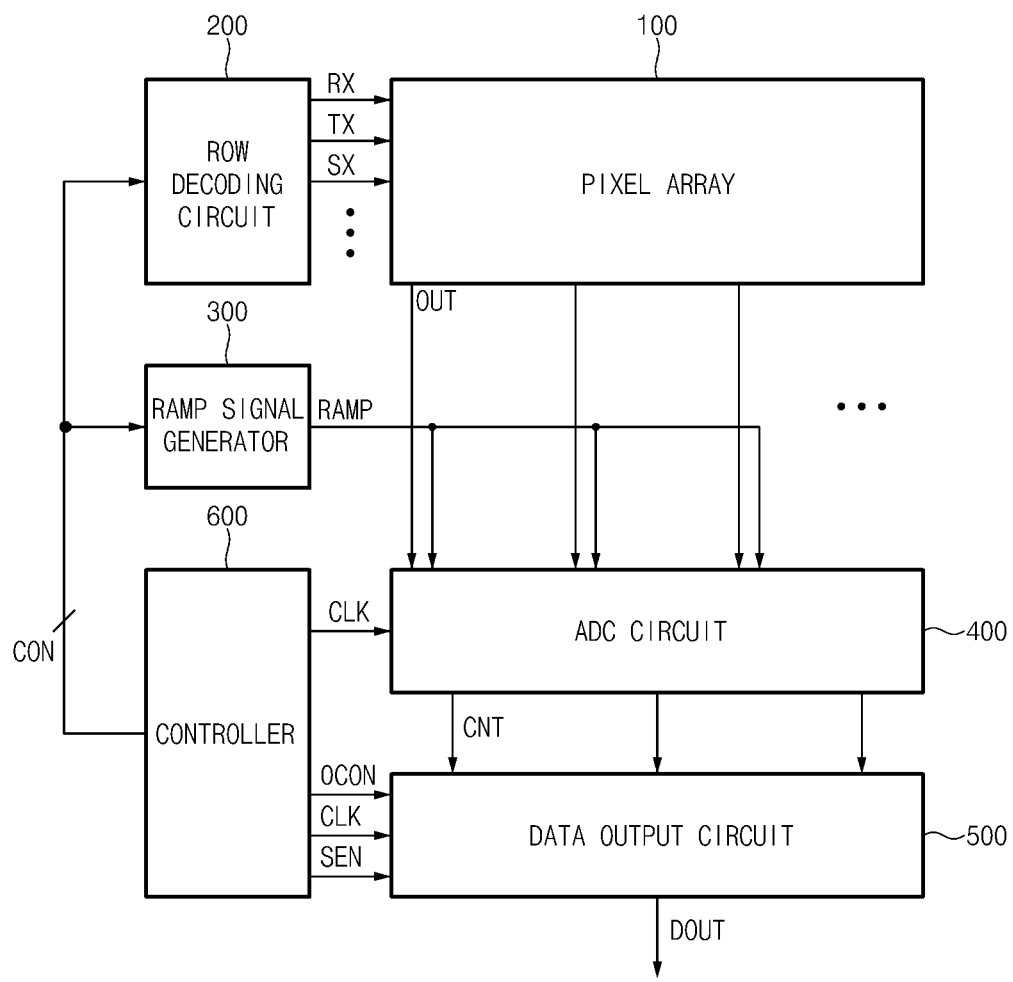
FIG. 1 is a block diagram illustrating an image sensor according to an embodiment of the disclosed technology.

FIG. 1 is a block diagram illustrating an image sensor according to an embodiment of the disclosed technology.

Referring to FIG. 1, the image sensor 10 according to the embodiment of the disclosed technology may include a pixel array 100, a row decoding circuit 200, a ramp signal generator 300, an analog-to-digital converter (ADC) circuit 400, a data output circuit 500, and a controller 600.

The pixel array 100 may include a plurality of pixels arranged in a matrix including rows and columns. The pixel array 100 may convert an incident light signal into an electrical signal, and may output an analog pixel signal OUT to the ADC circuit 400. In this case, the pixel array 100 may be driven by various drive signals, for example, a reset signal RX, a transmission signal TX, a selection signal SX, etc. that are received from the row decoding circuit 200.

The row decoding circuit 200 may select a row line of the pixel array 100. In other words, the row decoding circuit 200 may select at least one pixel for each row line from among pixels contained in the pixel array 100 according to individual row lines in response to a control signal CON received from the controller 600, and may control operations of the selected pixel.

The ramp signal generator 300 may generate a ramp signal RAMP in response to the control signal CON received from the controller 600, and may output the ramp signal RAMP to the ADC circuit 400.

The ADC circuit 400 may convert an analog pixel signal OUT received from the pixel array 100 into a digital signal. The ADC circuit 400 may include a correlated double sampler (CDS) circuit (not shown). The correlated double sampler (CDS) circuit may hold and sample the signals received from the pixels of the pixel array 100.

The ADC circuit 400 may compare the pixel signal OUT received from the pixel array 100 with the ramp signal RAMP received from the ramp signal generator 300, and may thus output a result of comparison between the pixel signal OUT and the ramp signal RAMP. The ADC circuit 400 may count the number of reference clock signals CLK received from the controller 600 in response to the result of comparison between the pixel signal OUT and the ramp signal RAMP, and may output a column-based counting signal CNT.

The data output circuit 500 may latch or hold the digital signal CNT received from the ADC circuit 400. The data output circuit 500 may latch or hold counting information, and may sequentially output pixel data DOUT in response to an output control signal OCON and a reference clock signal CLK. The data output circuit 500 according to the embodiment of the disclosed technology may measure and calculate a value of a crosstalk component of each pixel within the pixel array 100, may reflect the measured and calculated result in pixel data DOUT, and may thus output pixel data DOUT in which the crosstalk component value is corrected.

The controller 600 may control the row decoding circuit 200, the ramp signal generator 300, the ADC circuit 400, and the data output circuit 500. In this case, the controller 600 may include a timing generator. That is, the controller 600 may control overall procedures ranging from a process of sensing image data to a process of outputting the sensed image data according to a lapse of time.

For this purpose, the controller 600 may generate a control signal CON, and may output the control signal CON to the row decoding circuit 200 and the ramp signal generator 300. The controller 600 may generate a reference clock signal CLK, and may output the reference clock signal CLK to the ADC circuit 400. In addition, the controller 600 may generate an output control signal OCON, a reference clock signal CLK, and a sensing enable signal SEN, and may output the output control signal OCON, the reference clock signal CLK, and the sensing enable signal SEN to the data output circuit 500.

Figure 2:
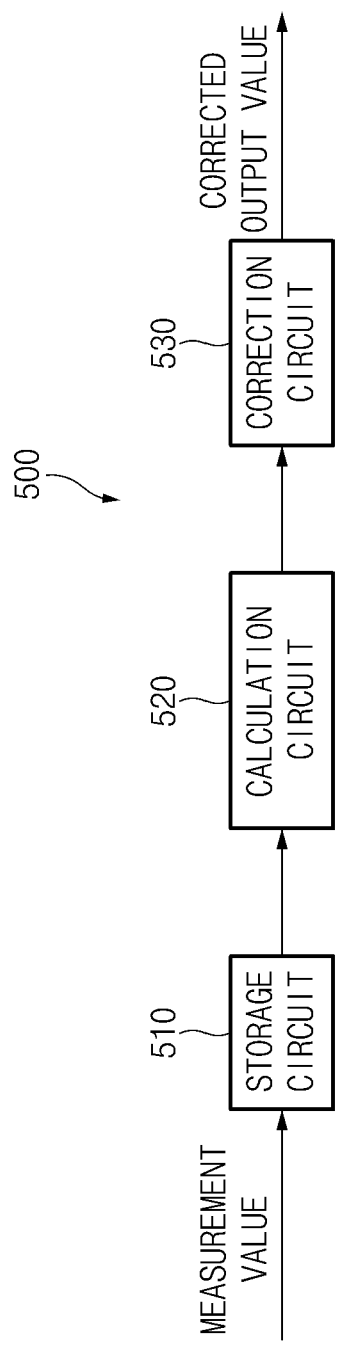
FIG. 2 is a detailed schematic diagram illustrating a data output circuit shown in FIG. 1 according to an embodiment of the disclosed technology.

FIG. 2 is a detailed schematic diagram illustrating the data output circuit 500 shown in FIG. 1. The data output circuit 500 shown in FIG. 2 will hereinafter be described centering upon some functions for measuring and calculating the value of a crosstalk component from among a plurality of functions of the data output circuit 500.

Referring to FIG. 2, the data output circuit 500 may include a storage circuit 510, a calculation circuit 520, and a correction circuit 530.

In this case, the storage circuit 510 may receive the digital signal CNT from the ADC circuit 400, and may store the received digital signal CNT in a unit of a line. The storage circuit 510 may output data in a unit of a column in response to the output control signal OCON received from the controller 600.

In the embodiment of the disclosed technology, the storage circuit 510 may store the value of a crosstalk component of each pixel that is measured in each unit test pattern (e.g., a unit test pattern of FIG. 3 to be described below).

In the embodiment of the disclosed technology, although the storage circuit 510 may be implemented as a line memory such as a static random access memory (SRAM) or a non-volatile memory such as a One-Time Programmable (OTP) memory, the scope or spirit of the disclosed technology is not limited thereto.

The calculation circuit 520 may calculate the sum of values of crosstalk components stored in the storage circuit 510, and may calculate crosstalk values of peripheral pixels affecting each target pixel. The target pixel may mean a pixel being targeted for obtaining crosstalk values. For example, the calculation circuit 520 may calculate a crosstalk value affecting contiguous pixels of the target pixel using the test pattern shown in FIG. 7. The crosstalk value calculated by the calculation circuit 520 may be used as a value for compensating for pixel data of a valid pixel region (see FIG. 9).

The correction circuit 530 may reflect the crosstalk value calculated by the calculation circuit 520 in the pixel data DOUT of each pixel, such that the correction circuit 530 may output the resultant pixel data in which the crosstalk value is corrected. In other words, the correction circuit 530 may compensate for the crosstalk value for each color about each target pixel.

For example, the correction circuit 530 may reflect a crosstalk value of a red pixel (hereinafter referred to as a red(R)-pixel crosstalk value) calculated by the calculation circuit 520 in R-pixel data, resulting in correction of pixel data. The correction circuit 530 may reflect a crosstalk value of a blue pixel (hereinafter referred to as a blue (B)-pixel crosstalk value) calculated by the calculation circuit 520 in B-pixel data, resulting in correction of pixel data. The correction circuit 530 may reflect a crosstalk value of a green (Gr) pixel (hereinafter referred to as a green (Gr)-pixel crosstalk value) calculated by the calculation circuit 520 in Gr-pixel data, resulting in correction of pixel data. The correction circuit 530 may reflect a crosstalk value of a green (Gb) pixel (hereinafter referred to as a green (Gb)-pixel crosstalk value) calculated by the calculation circuit 520 in Gb-pixel data, resulting in correction of pixel data.

Figure 3:
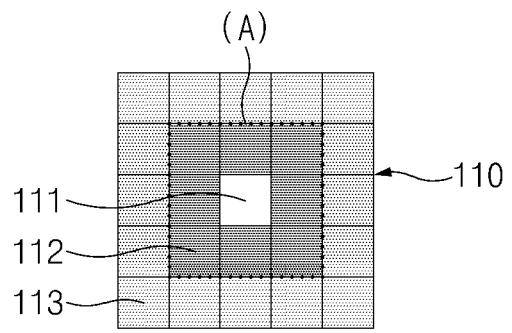
FIG. 3 is a schematic view illustrating a unit test pattern of the image sensor shown in FIG. 1 according to an embodiment of the disclosed technology.

FIG. 3 is a schematic view illustrating a unit test pattern UTP of the image sensor shown in FIG. 1. The unit test pattern (UTP) according to the embodiment of the disclosed technology may be included in the pixel array 100 of FIG. 1, and the position of the unit test pattern UTP will be described later.

Referring to FIG. 3, the unit test pattern UTP may include a plurality of pixels 110 arranged in a matrix. A single pixel arranged in the center region of the plurality of pixels 110 may be an open pixel 111. The open pixel 111 may have an open region in a manner that incident light can penetrate the open pixel 111 to reach a light receiving element.

In addition, each of 8 pixels (peripheral pixel) in a region A surrounding the open pixel 111 may be a light blocking pixel 112. The light blocking pixel 112 may have a blocking region in a manner that incident light cannot penetrate the light blocking pixel 112 and thus cannot reach a light receiving element.

In addition, each of 16 pixels surrounding the region A of the light blocking pixels 112 may be a protective pixel 113. The protective pixel 113 may prevent crosstalk from flowing in an undesired direction into the light blocking pixel 112.

FIGS. 4A to 4D are conceptual diagrams illustrating methods for measuring the value of a crosstalk component of each pixel in the unit test pattern UTP shown in FIG. 3 according to an embodiment of the disclosed technology.

Referring to FIGS. 4A to 4D, in accordance with the embodiment of the disclosed technology, each of four pixel patterns composed of the red pixel (R), the blue pixel (B), the green pixel (Gb), and the other green pixel (Gr) may be implemented as an open pixel 111. In this case, the terms "Red", "Blue", "Green", etc. may refer to color filters respectively written in the corresponding pixels.

Although four pixel patterns according to the present embodiment are composed of three kinds of colors, i.e., red (R), blue (B), first green (Gr), and second green (Gb), the scope or spirit of the disclosed technology is not limited thereto, and the four pixel patterns according to the present embodiment may also be implemented as other colors as necessary. In addition, although the first green (Gr) and the second green (Gb) are identical in color to each other, the first green (Gr) and the second green (Gb) may be regarded as different from each other so as to measure the value of a crosstalk component of each pixel.

The open pixel 111 disposed in the center region of the unit test pattern UTP may not be affected by crosstalk caused by the light blocking pixels 112. That is, the light blocking pixels 112 block a light, such that the crosstalk component may not be transferred from the light blocking pixels 112 to the open pixel 111.

On the other hand, the light blocking pixels 112 may be affected by crosstalk due to incident light penetrating the open pixel 111. Therefore, by measuring the crosstalk component value of each light blocking pixel 112, it is possible to detect each of the values of crosstalk components caused by the open pixel 111 which affects the light blocking pixels 112.

Figure 4A:
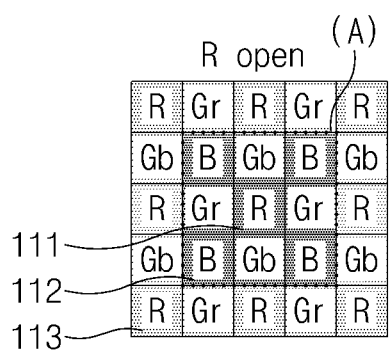
FIGS. 4A to 4D are conceptual diagrams illustrating methods for measuring a value of a crosstalk component of each pixel in the unit test pattern shown in FIG. 3 according to an embodiment of the disclosed technology.
Figure 4A:
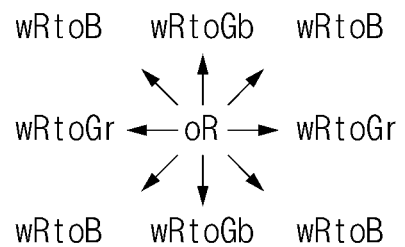

FIG. 4A illustrates the unit test pattern UTP having the red pixel (R) as the open pixel 111. The red pixel (R) may not be affected by crosstalk values caused by the light blocking pixels 112. The red pixel (R) that is not affected by crosstalk may be defined as a red pixel (oR).

For example, 8 light blocking pixels 112 (i.e., blue pixel (B), green pixel (Gb), blue pixel (B), green pixel (Gr), green pixel (Gr), blue pixel (B), green pixel (Gb), and blue pixel (B)) may be disposed in the peripheral region A of the red pixel (oR).

Therefore, the blue pixel (B) disposed at the left upper part of the open pixel 111 may measure the value (wRtoB) of a crosstalk component caused by the red pixel (oR). The green pixel (Gb) disposed at an upper part of the open pixel 111 may measure the value (wRtoGb) of a crosstalk component caused by the red pixel (oR). The blue pixel (B) disposed at a right upper part of the open pixel 111 may measure the value (wRtoB) of a crosstalk component caused by the red pixel (oR).

The green pixel (Gr) disposed at the left side of the open pixel 111 may measure the value (wRtoGr) of a crosstalk component caused by the red pixel (oR). The other green pixel (Gr) disposed at the right side of the open pixel 111 may measure the value (wRtoGr) of a crosstalk component caused by the red pixel (oR).

In addition, the blue pixel (B) disposed at a left lower part of the open pixel 111 may measure the value (wRtoB) of a crosstalk component caused by the red pixel (oR). The green pixel (Gb) located at a lower part of the open pixel 111 may measure the value (wRtoGb) of a crosstalk component caused by the red pixel (oR). The blue pixel (B) located at a right lower part of the open pixel 111 may measure the value (wRtoB) of a crosstalk component caused by the red pixel (oR).

Figure 4B:
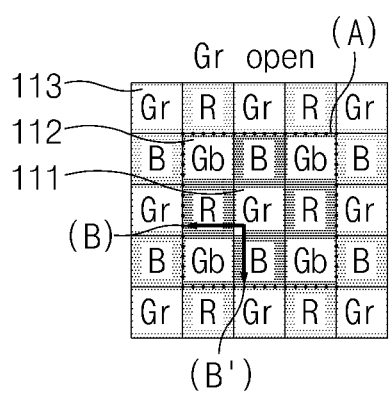
Figure 4B:
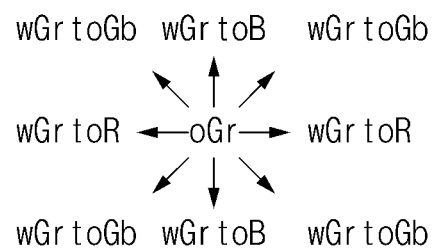

FIG. 4B illustrates the unit test pattern UTP having the green pixel (Gr) as the open pixel 111. The green pixel (Gr) may not be affected by crosstalk values caused by the light blocking pixels 112. The green pixel (Gr) that is not affected by crosstalk may be defined as a green pixel (oGr).

For example, 8 light blocking pixels 112 (i.e., green pixel (Gb), blue pixel (B), green pixel (Gb), red pixel (R), red pixel (R), green pixel (Gb), blue pixel (B), and green pixel (Gb)) may be disposed in the peripheral region A of the green pixel (oGr).

Therefore, the green pixel (Gb) disposed at the left upper part of the open pixel 111 may measure the value (wGrtoGb) of a crosstalk component caused by the green pixel (oGr). The blue pixel (B) disposed at an upper part of the open pixel 111 may measure the value (wGrtoB) of a crosstalk component caused by the green pixel (oGr). The green pixel (Gb) disposed at a right upper part of the open pixel 111 may measure the value (wGrtoGb) of a crosstalk component caused by the green pixel (oGr).

The red pixel (R) disposed at the left side of the open pixel 111 may measure the value (wGrtoR) of a crosstalk component caused by the green pixel (oGr). The other red pixel (R) disposed at the right side of the open pixel 111 may measure the value (wGrtoR) of a crosstalk component caused by the green pixel (oGr).

In addition, the green pixel (Gb) disposed at a left lower part of the open pixel 111 may measure the value (wGrtoGb) of a crosstalk component caused by the green pixel (oGr). The blue pixel (B) located at a lower part of the open pixel 111 may measure the value (wGrtoB) of a crosstalk component caused by the green pixel (oGr). The green pixel (Gb) located at a right lower part of the open pixel 111 may measure the value (wGrtoGb) of a crosstalk component caused by the green pixel (oGr).

Figure 4C:
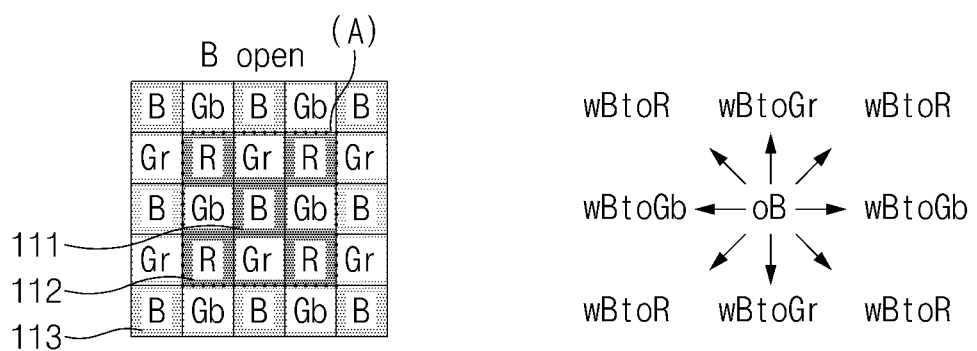

FIG. 4C illustrates the unit test pattern UTP having the blue pixel (B) as the open pixel 111. The blue pixel (B) may not be affected by crosstalk values caused by the light blocking pixels 112. The blue pixel (B) that is not affected by such crosstalk may be defined as a green pixel (oB).

For example, 8 light blocking pixels 112 (i.e., red pixel (R), green pixel (Gr), red pixel (R), green pixel (Gb), green pixel (Gb), red pixel (R), green pixel (Gr), and red pixel (R)) may be disposed in the peripheral region A of the blue pixel (oB).

Therefore, the red pixel (R) disposed at the left upper part of the open pixel 111 may measure the value (wBtoR) of a crosstalk component caused by the blue pixel (oB). The green pixel (Gr) disposed at an upper part of the open pixel 111 may measure the value (wBtoGr) of a crosstalk component caused by the blue pixel (oB). The red pixel (R) disposed at a right upper part of the open pixel 111 may measure the value (wBtoR) of a crosstalk component caused by the blue pixel (oB).

The green pixel (Gb) disposed at the left side of the open pixel 111 may measure the value (wBtoGb) of a crosstalk component caused by the green pixel (oB). The other green pixel (Gb) disposed at the right side of the open pixel 111 may measure the value (wBtoGb) of a crosstalk component caused by the blue pixel (oB).

In addition, the red pixel (R) disposed at a left lower part of the open pixel 111 may measure the value (wBtoR) of a crosstalk component caused by the blue pixel (oB). The green pixel (Gr) located at a lower part of the open pixel 111 may measure the value (wBtoGr) of a crosstalk component caused by the blue pixel (oB). The red pixel (R) located at a right lower part of the open pixel 111 may measure the value (wBtoR) of a crosstalk component caused by the blue pixel (oB).

Figure 4D:
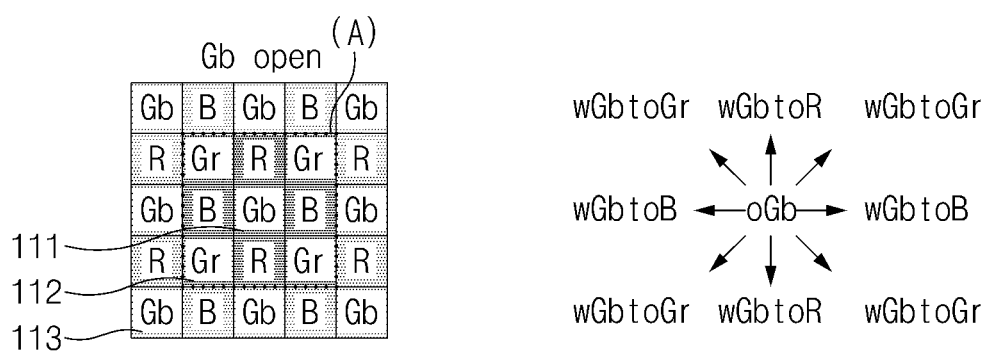

FIG. 4D illustrates the unit test pattern UTP having the green pixel (Gb) as the open pixel 111. The green pixel (Gb) may not be affected by crosstalk values caused by the light blocking pixels 112. The green pixel (Gb) that is not affected by such crosstalk may be defined as a green pixel (oGb).

For example, 8 light blocking pixels 112 (i.e., green pixel (Gr), red pixel (R), green pixel (Gr), blue pixel (B), blue pixel (B), green pixel (Gr), red pixel (R), and green pixel (Gr)) may be disposed in the peripheral region A of the green pixel (oGb).

Therefore, the green pixel (Gr) disposed at the left upper part of the open pixel 111 may measure the value (wGbtoGr) of a crosstalk component caused by the green pixel (oGb). The red pixel (R) disposed at an upper part of the open pixel 111 may measure the value (wGbtoR) of a crosstalk component caused by the green pixel (oGb). The green pixel (Gr) disposed at a right upper part of the open pixel 111 may measure the value (wGbtoGr) of a crosstalk component caused by the green pixel (oGb).

The blue pixel (B) disposed at the left side of the open pixel 111 may measure the value (wGbtoB) of a crosstalk component caused by the green pixel (oGb). The other blue pixel (B) disposed at the right side of the open pixel 111 may measure the value (wGbtoB) of a crosstalk component caused by the green pixel (oGb).

In addition, the green pixel (Gr) disposed at the left lower part of the open pixel 111 may measure the value (wGbtoGr) of a crosstalk component caused by the green pixel (oGb). The red pixel (R) disposed at a lower part of the open pixel 111 may measure the value (wGbtoR) of a crosstalk component caused by the green pixel (oGb). The green pixel (Gr) disposed at a right lower part of the open pixel 111 may measure the value (wGbtoGr) of a crosstalk component caused by the green pixel (oGb).

Figure 5:
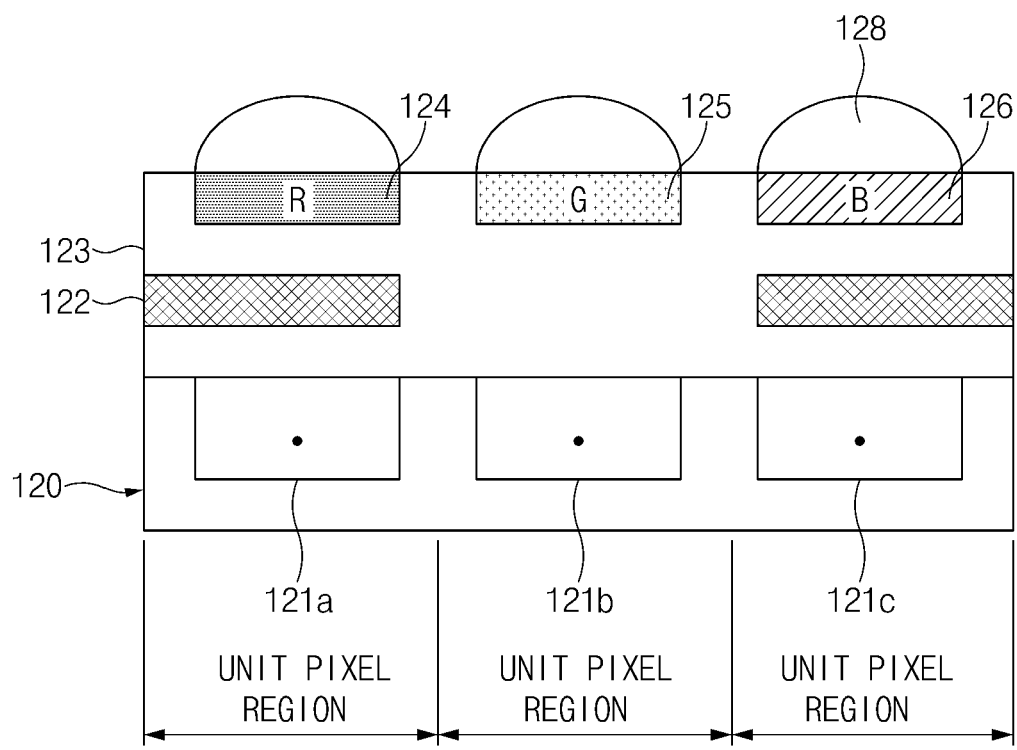
FIGS. 5 and 6 are structural views illustrating the unit test pattern shown in FIG. 4B according to an embodiment of the disclosed technology.
Figure 6:
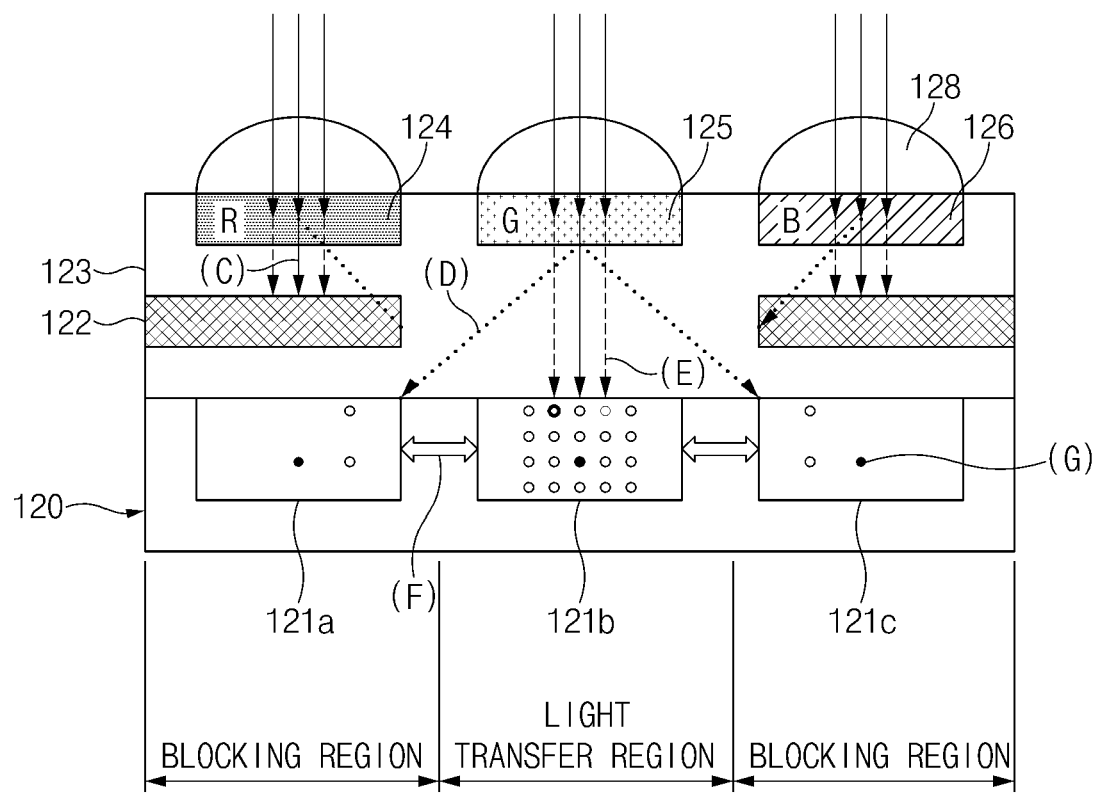

FIGS. 5 and 6 are structural views illustrating the unit test pattern UTP shown in FIG. 4B. In more detail, FIGS. 5 and 6 are cross-sectional views illustrating the unit test pattern UTP taken along the line B-B' shown in FIG. 4B. The embodiment shown in FIG. 5 may represent a dark state in which light does not illuminate the unit test pattern UTP, and the embodiment of FIG. 6 may represent a white state in which light illuminates the unit test pattern UTP.

Referring to FIG. 5, a plurality of unit pixel regions may be formed over a substrate 120 in the unit test pattern UTP. The substrate 120 may include light receiving elements 121a to 121c respectively corresponding to unit pixel regions. Each of the light receiving elements 121a to 121c may be isolated by a device isolation film (not shown). Each of the light receiving elements 121a to 121c may include a photodiode PD. In this case, the photodiode PD may generate photocharges using received light.

An interlayer insulation film 123 including a blocking layer 122 may be formed over the substrate 120. In this case, the blocking layer 122 may be formed of a metal line for shielding incident light. In other words, the blocking layer 122 may block incident light that is received from the outside through the color filters 124 and 126 in a manner that the incident light cannot reach the light receiving elements 121a and 121c.

A plurality of color filters 124 to 126 respectively corresponding to the unit pixel regions may be formed over the interlayer insulation film 123. The plurality of color filters 124 to 126 may be used to acquire color images. Each of the color filters 124 to 126 may be formed for each unit pixel region, such that the color filters 124 to 126 may isolate respective colors from the incident light.

In this case, the color filters 124 to 126 may represent different colors, and may include a red color filter (R), a green color filter (G), and a blue color filter (B). For example, the color filters 124 to 126 may include the red color (R) filter 124, the green color (G) filter 125, and the blue color (B) filter 126. Only red light from among RGB lights of incident light may penetrate the red color filter (R) 124. Only green light from among RGB lights of incident light may penetrate the green color filter (G) 125. Only blue light from among RGB lights of incident light may penetrate the blue color filter (B) 126.

A plurality of micro-lenses 128 respectively corresponding to the light receiving elements 121a to 121c may be respectively formed over the color filters 124 to 126. Each of the micro-lenses 128 may collect light into each unit pixel region. In this case, the micro-lens may be formed in a hemispherical shape.

As can be seen from the embodiment of FIG. 5, the green color filter (G) 125 may be implemented as the open pixel 111. If the green color filter (G) 125 is implemented as the open pixel 111, the blocking layer 122 may not be formed at a lower part of the green color filter (G) 125. On the other hand, the blocking layer 122 may be formed at a lower part of the red color filter (R) 124, and the other blocking layer 122 may be formed at a lower part of the blue color filter (B) 126. In more detail, each of the red color filter (R) 124 and the blue color filter (B) 126 may include the blocking layer 122 that blocks the incident light for measuring the values of crosstalk components caused by the light blocking pixels 112.

Referring to FIG. 6, if the unit test pattern UTP is in a white state, each of the red color filter (R) 124, the green color filter (G) 125, and the blue color filter (B) 126 may be illuminated by light. Although the pixels receive all of the red light (R), green light (G), and blue light (B), only the value of a specific color (i.e., R value, G value, or B value) corresponding to each of the color filters 124 to 126 respectively covering the pixels can be sensed.

A light transfer region will hereinafter be described with reference to FIG. 6. In more detail, light may penetrate the green color filter (G) 125 serving as the open pixel 111 from among three color filters 124 to 126, such that light may reach the light receiving element 121b. A blocking region will hereinafter be described with reference to FIG. 6. In the blocking region, the blocking layer 122 is not formed below the green color filter (G) 125 serving as the open pixel 111, such that incident light may reach the light receiving element 121b after passing through the interlayer insulation film 123. In contrast, light penetrating the red color filter (R) 124 and the blue color filter (B) 126 acting as the light blocking pixels 112 from among three color filters 124 to 126 may be blocked by the blocking layer 122, such that light does not reach the light receiving elements 121a and 121c.

In FIG. 6, the solid line (C) illustrates that light illuminates the unit test pattern UTP in the direction of an optical axis. The diagonal line (D) illustrates that crosstalk occurs in a spatial direction at a position between contiguous unit pixel regions. The line (E) illustrates that crosstalk occurs in a spectral direction in which light illuminates the unit test pattern UTP at a vertex of the micro-lens 128. The arrow (F) illustrates that crosstalk occurs between the light receiving elements 121a to 121c by an electrical field. The point (G) represents a fixed pattern noise (FPN) generable between the respective pixels.

The unit pixels contained in the pixel array 100 must receive only light components of unique colors. However, the unit pixels actually contiguous to each other are not completely isolated from each other, such that crosstalk may unavoidably occur between the unit pixels contiguous to each other.

Such crosstalk may transfer undesired light components to the contiguous unit pixels, thereby degrading the color discrimination power (i.e., color resolution) of the corresponding unit pixel. Such degradation in color resolution of the unit pixel may reduce sensitivity of the entire image sensor, resulting in reduction in image quality. In addition, undesired noise may exist between the respective pixels, such that it becomes difficult to distinguish between spatial crosstalk (i.e., crosstalk generated in the diagonal direction) and spectral crosstalk (i.e., crosstalk generated in the vertical direction), and it becomes impossible to recognize directivity of such crosstalk.

Referring to FIG. 6, only one color filter 125 may be opened, and light penetrating the remaining color filters 124 and 126 may be blocked by the blocking layer 122. As a result, although light penetrating the red color filter (R) 124 and the blue color filter (B) 126 are blocked by the blocking layer 122 and thus cannot reach the light receiving elements 121a and 121c, the value of a crosstalk component received from the color filter 125 may reach the light receiving elements 121a and 121c.

Crosstalk of each pixel is one of the important indexes for improving performance of each pixel, such that an accurate evaluation method for such crosstalk is needed. Therefore, the present embodiment may implement open pixel patterns respectively corresponding to four color patterns R, Gr, Gb and B. In addition, the value of a crosstalk component generated when light received from only one open pixel 111 is transferred to the light blocking pixels 112 can be measured.

That is, the values of crosstalk components affecting 8 light blocking pixels 112 and caused by the single open pixel 111 can be calculated, respectively. Therefore, at least one unit pixel, the color resolution of which is degraded by crosstalk, may be found, and characteristics of the found unit pixel may be improved, resulting in increased sensitivity of the entire image sensor.

Figure 7:
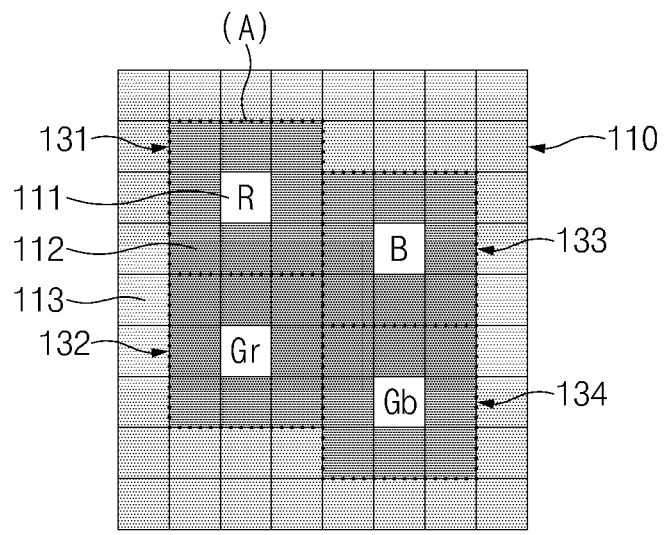
FIG. 7 is a structural view illustrating a test pattern for calculating a crosstalk value of each pixel in the image sensor shown in FIG. 1 according to an embodiment of the disclosed technology.

FIG. 7 is a structural view illustrating a test pattern TP for calculating a crosstalk value of each pixel in the image sensor shown in FIG. 1 according to an embodiment of the disclosed technology.

Referring to FIG. 7, the test pattern TP may include a plurality of pixels 110 arranged in a matrix. For example, the plurality of pixels 110 may include 8 pixels arranged in a row direction and 9 pixels arranged in a column direction, such that the pixels 110 may include a total of 72 pixels.

In order to calculate the values of crosstalk components as described with reference to FIGS. 4A to 4D, the four unit test patterns (UTPs) described with reference to FIGS. 4A to 4D may be combined into the single test pattern TP, resulting in plural patterns of pixel groups 131 to 134. The plurality of pixel groups 131 to 134 may be contiguous to each other in a horizontal direction or in a vertical direction.

The pixel group 131 may include the red pixel (R) as the open pixel 111. The pixel group 132 may include the green pixel (Gr) as the open pixel 111. The pixel group 133 may include the blue pixel (B) as the open pixel 111. The pixel group 134 may include the green pixel (Gb) as the open pixel 111.

FIGS. 8A to 8D are conceptual diagrams illustrating methods for calculating a crosstalk value of a target pixel in response to the test pattern TP shown in FIG. 7 according to an embodiment of the disclosed technology.

From the viewpoint of the pixel structure of the valid pixel region, the values of crosstalk components generated in different directions may be the sum of the values of crosstalk components measured in each of the unit test patterns (UTPs) shown in FIGS. 4A to 4D. Therefore, the values of crosstalk components measured in each test pattern TP shown in FIGS. 8A to 8D may be remapped, such that the crosstalk value (Xtalk) of each target pixel can be calculated based on the remapped result. In this case, the re-mapping may mean re-combining values of the crosstalk components according to the test pattern.

Figure 8A:
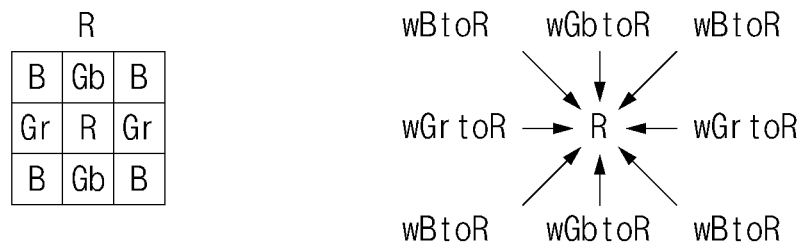
FIGS. 8A to 8D are conceptual diagrams illustrating methods for calculating a crosstalk value of a target pixel in response to the test pattern shown in FIG. 7 according to an embodiment of the disclosed technology.

Referring to FIG. 8A, the value of a crosstalk component generated in the valid pixel region may be the sum of crosstalk components generated in 8 pixels surrounding the red pixel (R). The crosstalk value (Xtalk@R) caused by the peripheral pixels and affecting the red pixel (R) may be calculated using the following equation 1.

$$\text{Xtalk@R} = (w\text{BtoR} + w\text{GbtoR} + w\text{BtoR} + w\text{GrtoR} + w\text{GrtoR} + w\text{BtoR} + w\text{GbtoR} + w\text{BtoR}) \cdot (8 \times dR) \quad \text{[Equation 1]}$$

Referring to Equation 1, the crosstalk value (Xtalk@R) may be acquired by calculating the sum of the values of crosstalk components caused by the 8 contiguous pixels measured in the unit test pattern UTP shown in FIG. 4A. In order to remove the fixed pattern noise (FPN) included in each pixel, the value (dR) of the red pixel (R) in the dark state may be subtracted from the above sum of crosstalk values as shown in FIG. 5.

Figure 8B:
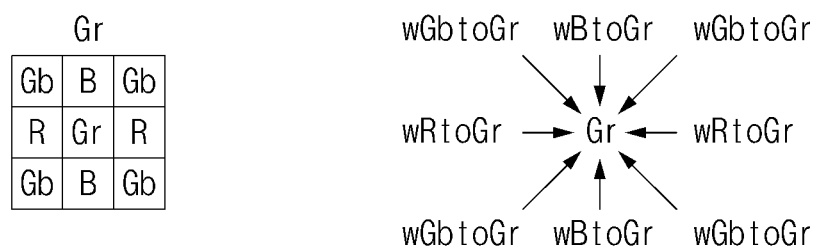

Referring to FIG. 8B, the sum of the values of crosstalk components generated in the valid pixel region may be the sum of crosstalk components generated in 8 pixels surrounding the green pixel (Gr). The crosstalk value (Xtalk@Gr) caused by the peripheral pixels surrounding the green pixel (Gr) may be calculated using the following equation 2.

$$Xtalk@Gr=(wGbtoGr+wBtoGr+wGbtoGr+wRtoGr+wRtoGr+wGbtoGr+wBtoGr+wGbtoGr)\cdot(8\times dGr) \quad \text{[Equation 2]}$$

Referring to Equation 2, the crosstalk value (Xtalk@Gr) may be acquired by calculating the sum of the values of crosstalk components caused by the 8 peripheral pixels measured in the unit test pattern UTP shown in FIG. 4B. In order to remove the fixed pattern noise (FPN) included in each pixel, the value (dGr) of the green pixel (Gr) in the dark state may be subtracted from the above sum of crosstalk values as shown in FIG. 5.

Figure 8C:
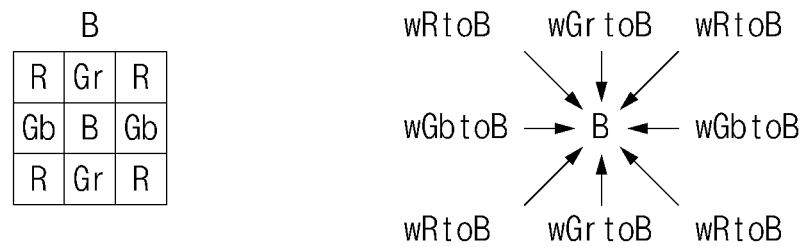

Referring to FIG. 8C, the sum of the values of crosstalk components generated in the valid pixel region may be the sum of crosstalk components generated in 8 pixels surrounding the blue pixel (B). The crosstalk value (Xtalk@B) caused by the peripheral pixels surrounding the blue pixel (B) may be calculated using the following equation 3.

$$Xtalk@B=(wRtoB+wGrtoB+wRtoB+wGbtoB+wGbtoB+wRtoB+wGrtoB+wRtoB)\cdot(8\times dB) \quad \text{[Equation 3]}$$

Referring to Equation 3, the crosstalk value (Xtalk@B) may be acquired by calculating the sum of the values of crosstalk components caused by the 8 peripheral pixels measured in the unit test pattern UTP shown in FIG. 4C. In order to remove the fixed pattern noise (FPN) included in each pixel, the value (dB) of the blue pixel (B) in the dark state may be subtracted from the above sum of crosstalk values as shown in FIG. 5.

Figure 8D:
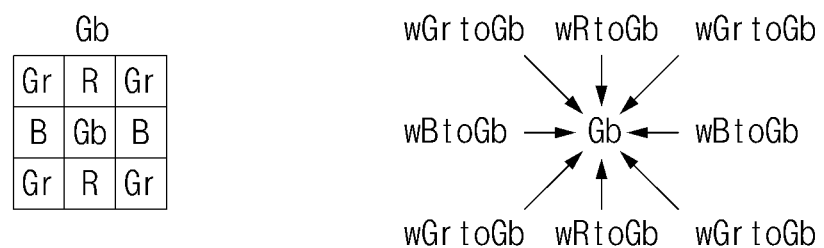

Referring to FIG. 8D, the sum of the values of crosstalk components generated in the valid pixel region may be the sum of crosstalk components generated in 8 pixels surrounding the green pixel (Gb). The crosstalk value (Xtalk@Gb) caused by the peripheral pixels surrounding the green pixel (Gb) may be calculated using the following equation 4.

$$Xtalk@Gb=(wGrtoGb+wRtoGb+wGrtoGb+wBtoGb+wBtoGb+wGrtoGb+wRtoGb+wGrtoGb)\cdot(8\times dGb) \quad \text{[Equation 4]}$$

Referring to Equation 4, the crosstalk value (Xtalk@Gb) may be acquired by calculating the sum of the values of crosstalk components caused by the 8 peripheral pixels measured in the unit test pattern UTP shown in FIG. 4D. In order to remove the fixed pattern noise (FPN) included in each pixel, the value (dGb) of the green pixel (Gb) in the dark state may be subtracted from the above sum of crosstalk values as shown in FIG. 5.

Figure 9:
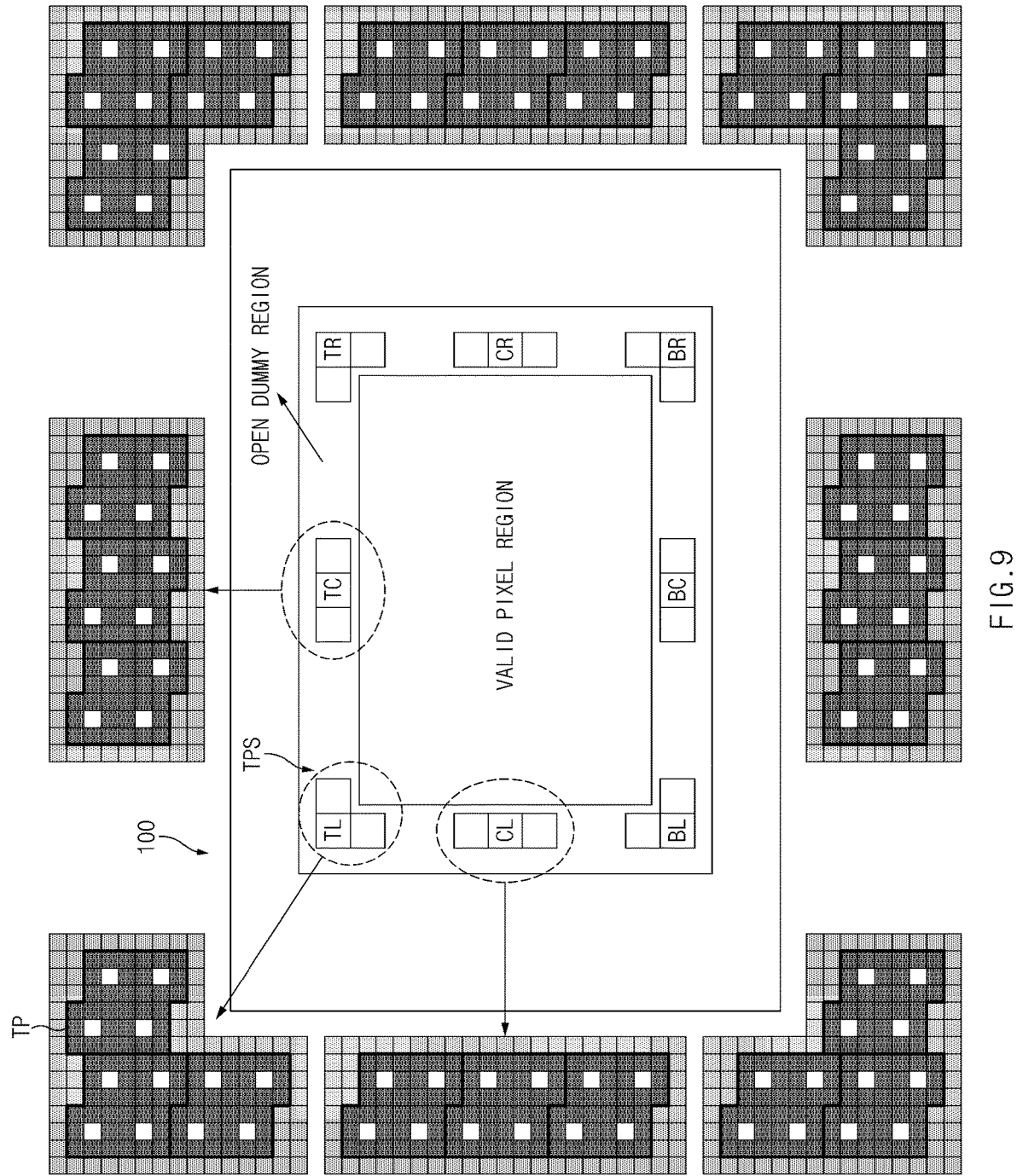
FIGS. 9 and 10 are conceptual diagrams illustrating the position of the test pattern shown in FIG. 7 according to an embodiment of the disclosed technology.
Figure 10:
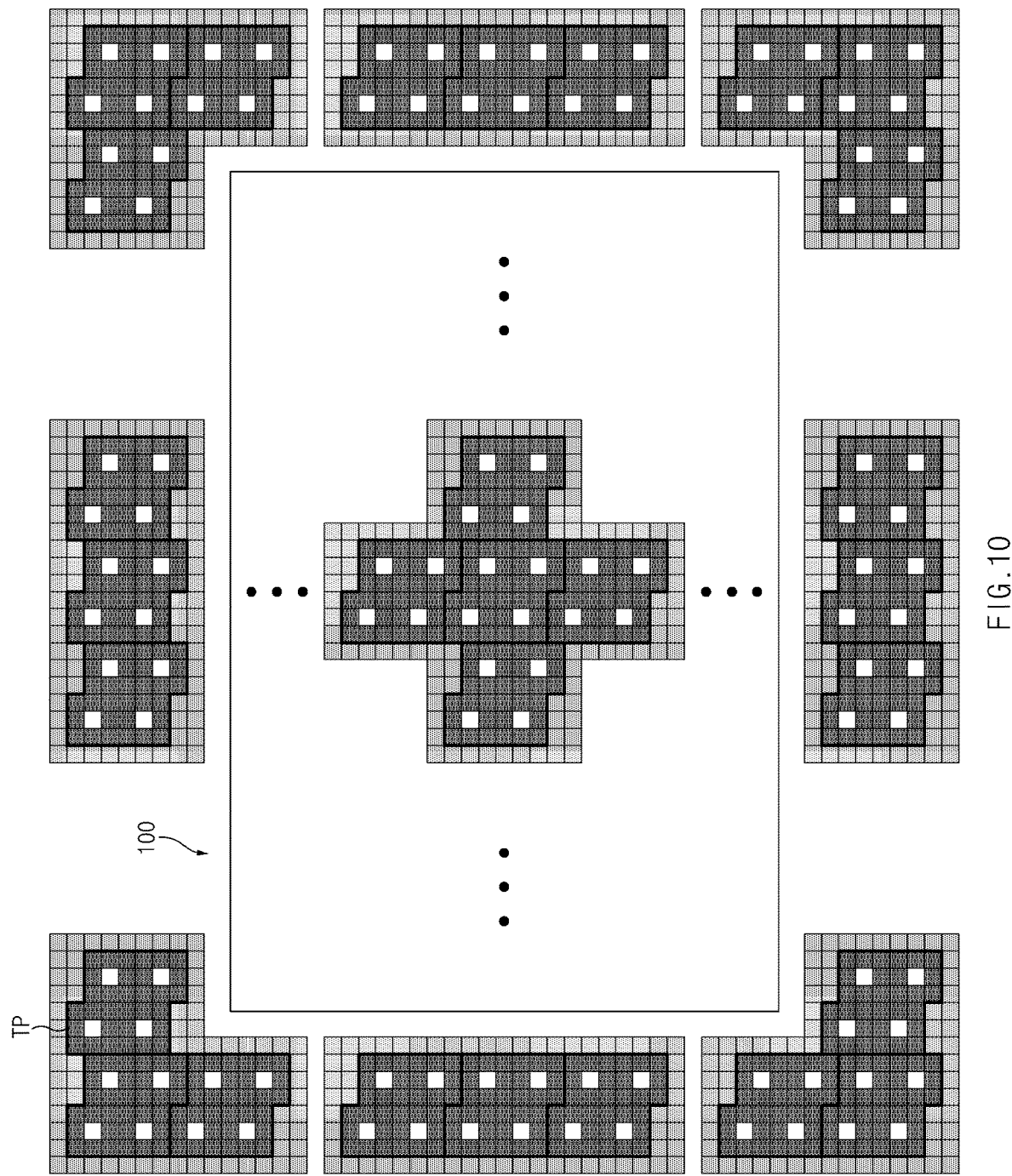

FIGS. 9 and 10 are conceptual diagrams illustrating the position of the test pattern TP shown in FIG. 7 according to an embodiment of the disclosed technology.

Referring to FIG. 9, the test pattern TP may include a plurality of test patterns contiguous to each other, such that the plurality of test patterns contained in the test pattern TP may be formed in a unit of a set of test patterns (hereinafter referred to as a test pattern set TPS). At least one test pattern set (TPS) may be disposed in an open dummy region located outside the valid pixel region of the pixel array 100. For example, the test pattern sets (TPSs) may be respectively disposed at a top-center (TC) part, a top-left (TL) part, a top-right (TR) part, a center-left (CL) part, a center-right (CR) part, a bottom-center (BC) part, a bottom-left (BL) part, and a bottom-right (BR) part of the valid pixel region of the pixel array 100.

Referring to FIG. 10, the plurality of test patterns (TPs) may be disposed in the valid pixel region of the pixel array 100 and in the open dummy region, and may also be disposed in the entire region including the center region.

As is apparent from the above description, the image sensor according to the embodiments of the disclosed technology may correctly recognize information about the magnitude and directivity of a crosstalk component of each pixel, and may improve a structural vulnerable point of the pixel based on the recognized information, resulting in improvement in system performance.

Those skilled in the art will appreciate that the disclosed technology may be carried out in other specific ways than those set forth herein without departing from the spirit and essential characteristics of the disclosed technology. The above embodiments are therefore to be construed in all aspects as illustrative and not restrictive. The scope of the disclosed technology should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment of the disclosed technology or included as a new claim by a subsequent amendment after the application is filed.

Although a number of illustrative embodiments consistent with the disclosed technology have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. An image sensor comprising:
    a pixel array including a plurality of unit test patterns, each of which is used to measure values of crosstalk components of a plurality of light blocking pixels generated by a single open pixel, the light blocking pixels and the single open pixel included in the unit test pattern;
    a storage circuit configured to store the measured values of the respective unit test patterns;
    a calculation circuit configured to calculate a crosstalk value for each target pixel included in the pixel array by combining the stored values; and
    a correction circuit configured to correct pixel data of the target pixel by reflecting the calculated crosstalk value in the pixel data,
    wherein a first unit test pattern among the plurality of unit test patterns includes a first open pixel and a plurality of first light blocking pixels surrounding the first open pixel and a second unit test pattern among the plurality of unit test patterns includes a second open pixel and a plurality of second light blocking pixels surrounding the second open pixel,
    wherein at least a part of the plurality of first light blocking pixels are disposed in a top row line and a bottom row line which are directly adjacent to the first open pixel, and at least a part of the plurality of second light blocking pixels are disposed in a top row line and a bottom row line which are directly adjacent to the second open pixel, wherein the top row line and the bottom row line of the first open pixel, and the top row line and the bottom row line of the second open pixel are not contiguous within a same corresponding row line, and wherein the first open pixel and the second open pixel are disposed on different row lines.

2. The image sensor according to claim 1, wherein each of the plurality of unit test patterns includes:
- a substrate including a plurality of unit pixel regions respectively corresponding to the light blocking pixels and the single open pixel;
- a plurality of color filters formed over the substrate and respectively corresponding to the unit pixel regions; and
- a blocking layer formed below the color filters respectively corresponding to the light blocking pixels, and configured to block incident light penetrating the color filters respectively corresponding to the light blocking pixels.

3. The image sensor according to claim 2, wherein light incident upon the plurality of light blocking pixels is blocked by the blocking layer.

4. The image sensor according to claim 1, wherein the single open pixel is formed in a center region of the unit test pattern and the plurality of light blocking pixels are disposed in a peripheral region of the single open pixel.

5. The image sensor according to claim 4, wherein each of the unit test patterns further includes a plurality of protective pixels disposed in a peripheral region of the plurality of light blocking pixels.

6. The image sensor according to claim 5, wherein the plurality of protective pixels is disposed to surround the plurality of light blocking pixels in a plane.

7. The image sensor according to claim 4, wherein light incident upon the single open pixel reaches a light receiving element disposed under a single color filter of the single open pixel.

8. The image sensor according to claim 4, wherein when light is incident upon the single open pixel, each of the unit test patterns is used to measure a value of a crosstalk component affecting each of the light blocking pixels which is caused by the single open pixel.

9. The image sensor according to claim 4, wherein the single open pixels of the unit test patterns have different colors from one another.

10. The image sensor according to claim 4, wherein the plurality of light blocking pixels is disposed to surround the open pixel in a plane.

11. The image sensor according to claim 4, wherein the open pixel is any one of a red pixel, a green pixel, and a blue pixel.

12. The image sensor according to claim 1, wherein the plurality of unit test patterns is located contiguous to each other to form a test pattern.

13. The image sensor according to claim 12, wherein the test pattern includes:
- a first unit test pattern in which a pixel having a first color is implemented as the single open pixel;
- a second unit test pattern in which a pixel having a second color is implemented as the single open pixel;
- a third unit test pattern in which a pixel having a third color is implemented as the single open pixel; and
- a fourth unit test pattern in which a pixel having a fourth color is implemented as the single open pixel.

14. The image sensor according to claim 13, wherein the first to fourth colors are different from each other.

15. The image sensor according to claim 12, wherein the test pattern is formed in an open dummy region disposed outside a valid pixel region of the pixel array.

16. The image sensor according to claim 15, wherein the test pattern is disposed in at least one of a top-center (TC) part, a top-left (TL) part, a top-right (TR) part, a center-left (CL) part, a center-right (CR) part, a bottom-center (BC) part, a bottom-left (BL) part, and a bottom-right (BR) part of the valid pixel region in a plane.

17. The image sensor according to claim 12, wherein the test pattern is formed in a unit of a test pattern set in which a plurality of test patterns is located contiguous to each other.

18. The image sensor according to claim 12, wherein the test pattern is formed in an entire region including a center region of the pixel array.

19. The image sensor according to claim 1, wherein the calculation circuit calculates a sum of values of crosstalk components of a plurality of peripheral pixels located in a peripheral region surrounding the target pixel, subtracts a value of the target pixel in a dark state from the calculated sum, and calculates the crosstalk value for the target pixel.

20. The image sensor according to claim 19, wherein the value of the target pixel in the dark state is a fixed pattern noise (FPN) of the target pixel.

* * * * *